No. 868,029. PATENTED OCT. 15, 1907.
D. STITZER.
RACE STARTING APPARATUS.
APPLICATION FILED JAN. 30, 1907.
2 SHEETS—SHEET 1.
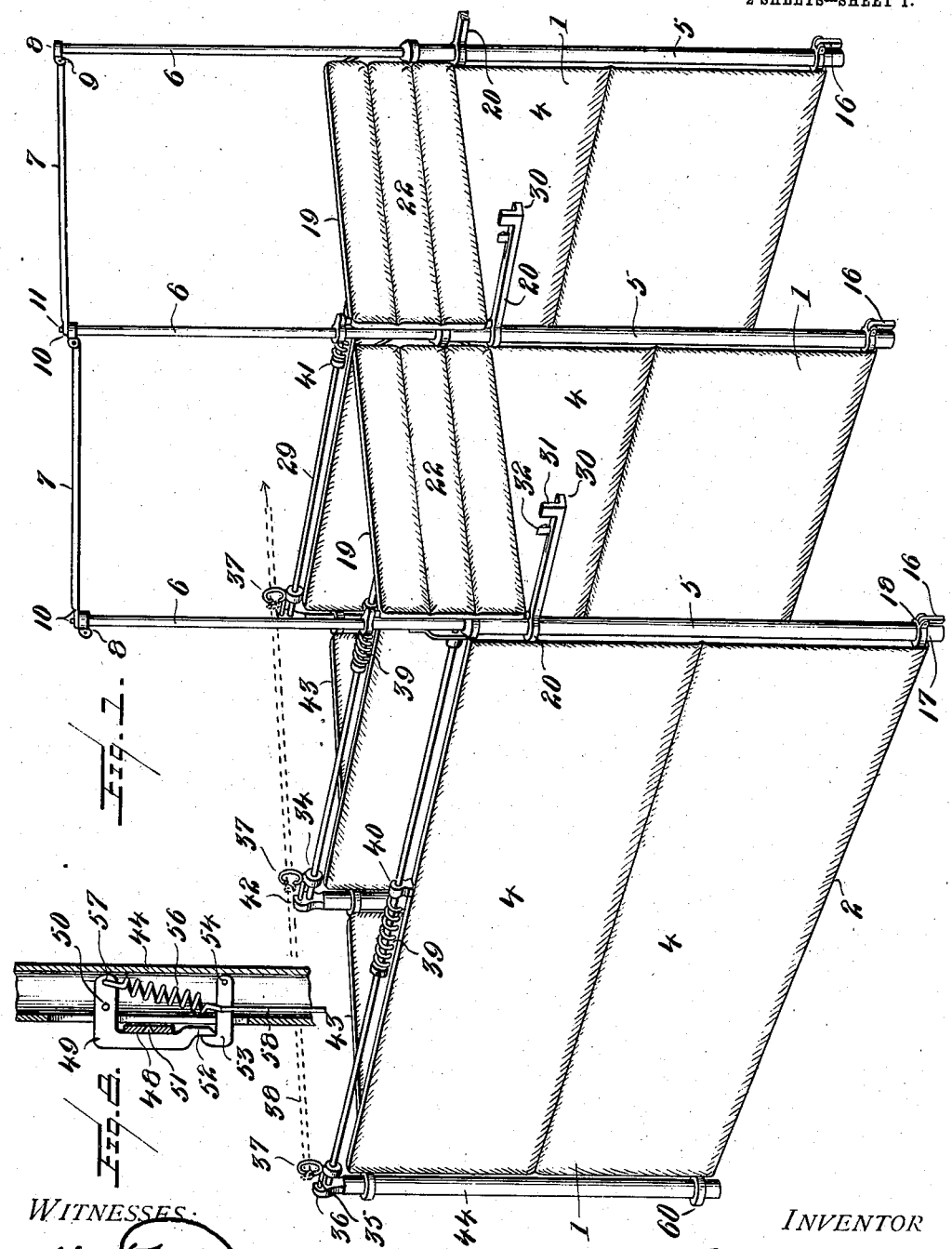
WITNESSES:
INVENTOR
David Stitzer.
BY
Attorney No. 868,029. PATENTED OCT. 15, 1907.
D. STITZER.
RACE STARTING APPARATUS.
APPLICATION FILED JAN. 30, 1907.
2 SHEETS—SHEET 2.
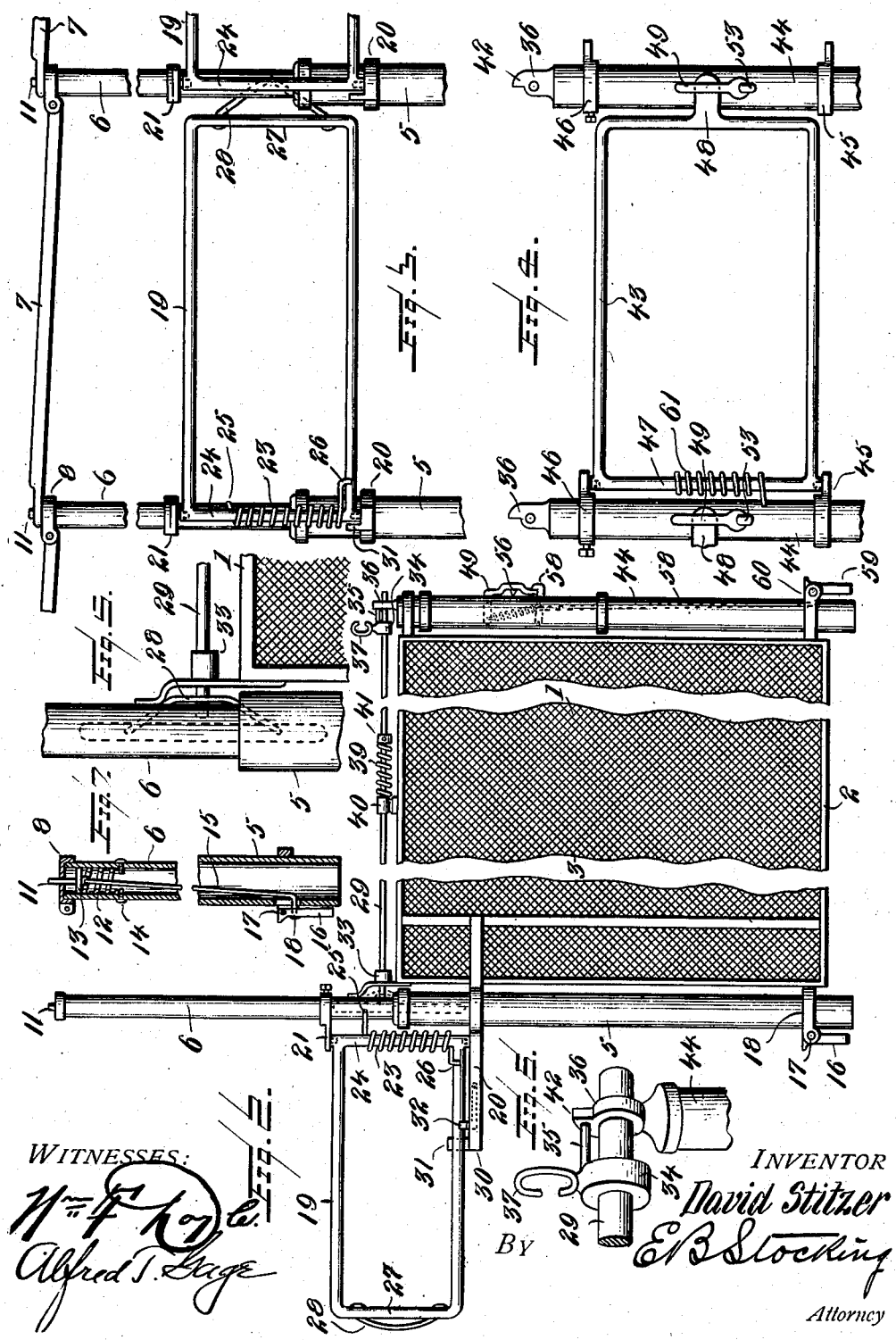
WITNESSES:
INVENTOR
David Stitzer
BY
E B Stocking
Attorney

UNITED STATES PATENT OFFICE.

DAVID STITZER, OF LEXINGTON, KENTUCKY, ASSIGNOR OF ONE-HALF TO WILLIAM R. HUTCHISON, OF LEXINGTON, KENTUCKY.

RACE-STARTING APPARATUS.

No. 868,029.　　　　　Specification of Letters Patent.　　　　Patented Oct. 15, 1907.

Application filed January 30, 1907. Serial No. 354,896.

*To all whom it may concern:*

Be it known that I, DAVID STITZER, a citizen of the United States, residing at Lexington, in the county of Fayette, State of Kentucky, have invented certain new and useful Improvements in Race-Starting Apparatus, of which the following is a specification, reference being had therein to the accompanying drawing.

This invention relates to a race starting apparatus, and particularly to a device where the barriers for the horses are simultaneously released.

The invention has for an object to provide a plurality of stalls each provided with a barrier at one end which are adapted to be automatically opened and to be simultaneously released by a unitary device so as to effect an even starting at a given signal.

A further object of the invention is to provide an improved construction of such an apparatus so as to permit the ready removal thereof from the race track after the starting so that in subsequent laps there will be no obstruction to the horses in passing a given starting point.

Other and further objects and advantages of the invention will be hereinafter set forth and the novel features thereof defined by the appended claims.

In the drawings:—Figure 1 is a perspective of the apparatus in position for use; Fig. 2 is a detail elevation of one of the stall walls with the barrier in opened position; Fig. 3 is a front elevation of the frame of this barrier; Fig. 4 is a similar view of the rear gate of the stall; Fig. 5 is an enlarged detail elevation of the retaining means for the barrier. Fig. 6 is a detail perspective of the releasing device for the barrier; Fig. 7 is a detail vertical section of the retaining and releasing device for the cross bar between the stall posts, and Fig. 8 is a detail section of the retaining device for the rear gates of the stalls.

Like numerals refer to like parts in the several views of the drawings.

This invention comprises a plurality of stalls disposed in alinement with each other and composed of the side walls 1 which preferably consist of the frame 2 covered with a reticulated material 3, as shown in Fig. 2, such material being covered with the padding 4 or other surface to protect the animal from injury by contact therewith, as shown in Fig. 1. These side walls are supported by front posts 5 which rest at their lower ends upon the ground and are provided at their tops with extensions 6 each carrying a cross bar 7 by which the stalls are connected together, and retained in position when the barriers and gates are opened. These cross bars may be mounted in any desired manner, for instance by means of the clamps 8 embracing one of the extensions 6 and provided with a pivot 9 upon which the cross bar is mounted the opposite end 10 of the bar being apertured and adapted to receive the bolt 11 which extends upward from the extension 6 of the post, as shown in Fig. 7. This bolt is normally held in elevated position by means of the spring 12 extending between the head 13 of the bolt and the fixed projection 14 of the extension. When it is desired to remove the sides of the stalls, the bolt may be retracted by means of the connection 15 extending to the operating lever 16 at the base of the standard or post 5. This lever is pivoted at 17 in a sleeve 18 surrounding the post, and when swung into a horizontal position retracts the bolt 11.

Pivotally mounted upon the post is a barrier frame 19 which is mounted by means of the bracket 20 at the lower portion thereof and the pivoting sleeve 21 which is secured at the upper portion thereof. This barrier may be padded with any suitable material for protection, as shown at 22 in Fig. 1. The barrier is normally retained under tension by means of the spring 23 surrounding the portion 24 of its frame and bearing at its end 25 against the post, while its opposite end 26 engages the frame of the barrier. The frame 27 of this barrier is provided with a retaining means, for instance, a loop 28 which is adapted to be engaged by a locking rod 29, as shown in Fig. 5. When this barrier is in its open position, as shown in Fig. 2, it is retained by means of an extension 30 from the bracket 20 which carries a stop lug 31 to engage the frame of the barrier, and a spring held latch 32 mounted in said extension to be depressed by the lower frame of the barrier in its passage thereover, and in its retraction to engage and hold the barrier in open position to prevent rebound against the horse when the barrier is opened.

The rod 29 by which the barrier is released is slidably mounted at its front in a bearing 33 carried by the side walls of the stall, and at its rear end by a similar bearing 36 through which it extends. The collar 34 is provided with a projecting pin 35 which bears upon the bearing 36, and the collar is provided with an eye 37 which is adapted to receive the operating cord or cable 38 having connections or projections to engage and simultaneously operate and release the series of rods by a rotative movement thereof and extending to a point at one side of the apparatus. For the purpose of automatically retracting each rod a spring 39 is mounted thereon and extends between the bearing 40 upon the upper surface of the side wall and a stop 41 secured to the rod. By reference to Fig. 6 it will be seen that a rotative movement of the rod 29 will carry the pin 35 out of engagement with the projection 42 upon the bearing 36 so as to permit a longitudinal movement of the rod 29 which when it is free from engagement with the barrier permits the same to be automatically opened.

At the rear of the stalls gates 43 are provided and padded similarly to the side walls and barriers, said gates being pivotally mounted upon the rear posts 44 which rest upon the ground, by means of the bearing collars 45 at their lower portion and the adjustably mounted collars 46 at their upper ends which engage the side bar 47 of the gate to pivotally mount the same. This gate is provided with the apertured locking plate 48 which, as shown in Fig. 8, is adapted to be held by a latching lever 49 pivotally mounted at 50 upon or within the rear post 44 and provided with a projection 51 to enter the aperture in said plate. The lower end of this lever is formed with a retaining portion 52 adapted to engage the hook 53 which is pivoted at 54 on the post and held in engagement with the portion 52 by means of the coiled spring 56 extending therefrom to the inner end 57 of the lever 49. When it is desired to release the parts the hook 53 is withdrawn by means of the connection 58 extending downwardly to the operating lever 59 pivotally mounted at 60 upon the rear post 44. When this lever is turned into a horizontal position the hook 53 is withdrawn from the latch and the spring 56 throws the same outward so as to immediately release the plate 48 and permit the rear gate to be automatically thrown open by the spring 61 mounted thereon and engaging the post 44 to place the gate under tension.

From the foregoing description the construction and general operation of the invention will be apparent, and it will be observed that with the apparatus assembled, as shown in Fig. 1, any desired number of stalls may be employed depending upon the number of horses to be started in the race, the rear gates thereof being left open so that the horse may enter. The rear gate is then closed and at the time of starting the rods controlling the barriers simultaneously operated so that said barriers are automatically thrown open. The apparatus may then be removed entirely from the track by throwing upward the levers controlling the bolts for the cross bars at the top of the front standards, and also the controlling levers for the rear gates which when open leave the sides free to be independently removed by the attendants without difficulty or delay so that in the next lap of the race the track is entirely free from obstruction.

It will also be observed that both the barriers and gates are carried by the stall sides so that they may be assembled in any desired number, and the invention presents a simplicity of construction and operation which avoids any difficulty in assembling or using the same.

Having thus described my invention and set forth its merits what I claim and desire to secure by Letters Patent is:—

1. In a device of the class described, a plurality of side walls forming parallel stalls, barriers pivotally mounted upon said walls, and means for simultaneously releasing and opening said barriers.

2. In a device of the class described, a plurality of side walls forming parallel stalls, barriers pivotally mounted upon said walls, means for simultaneously releasing and opening said barriers, and means for retaining said barriers against rebound when in opened position.

3. In a device of the class described, a plurality of independent side walls forming parallel stalls, barriers movably mounted upon said walls, means for simultaneously releasing and opening said barriers, and cross bars extending between the posts of said sides for detachably connecting the same laterally.

4. In a device of the class described, a plurality of side walls forming parallel stalls, barriers movably mounted upon said walls, means for simultaneously releasing and opening said barriers, cross bars extending between the posts of said sides for connecting the same laterally, and means disposed at the lower portion of said posts for releasing the same.

5. In a device of the class described, a plurality of side walls forming parallel stalls, barriers pivotally mounted upon said walls, means for simultaneously releasing and opening said barriers, and rear gates pivotally mounted upon said sides and provided with means for automatically opening said gates.

6. In a device of the class described, a plurality of side walls forming parallel stalls, barriers movably mounted upon said walls, means for simultaneously releasing and opening said barriers, rear gates movably mounted upon said sides and means for releasing and automatically opening said gates.

7. In a device of the class described, side walls provided with front and rear posts, barriers pivotally mounted upon a front post, springs for normally retaining each barrier in open position, means for retaining each barrier in closed position under tension, and means for simultaneously operating the retaining means.

8. In a device of the class described, side walls provided with front and rear posts, barriers pivotally mounted upon a front post, means for holding each barrier in closed position under tension, means for simultaneously operating said holding means, a bracket provided with a stop lug to engage each barrier, and a latch adapted to automatically engage each barrier and hold it in open position.

9. In a device of the class described, side walls provided with front and rear posts, an extension upward from the front post, a bolt slidably mounted in said extension to project from the upper end thereof, a connection extending downward from said bolt, and a cross bar pivoted upon one extension and provided with an apertured free end to engage said bolt.

10. In a device of the class described, side walls provided with posts at opposite ends, a pivotally mounted barrier upon one of said posts, a locking rod disposed to engage and retain said barrier in closed position, a spring adapted to move said rod longitudinally, a pin carried by said rod to engage a fixed bearing, and means for moving said rod to throw the pin out of engagement with its bearing.

11. In a device of the class described, side walls provided with posts at their opposite ends, a pivotally mounted barrier upon one of said posts, a locking rod disposed to engage and retain said barrier in closed position, a spring adapted to move said rod longitudinally, a collar carried by said rod and provided with a pin extending parallel therewith, a fixed end bearing for said rod provided with a projection to normally engage said pin, and an eye carried by said collar by which said pin may be moved out of engagement with said projection to permit longitudinal movement of said rod.

12. In a device of the class described, side walls provided with front and rear posts, a barrier carried by the front post, a gate pivotally mounted upon the rear post and provided with a locking plate, a pivoted lever adapted to engage said plate, a hook to retain said lever in locked position, and an operating device extending from said hook to release the same from said lever.

13. In a device of the class described, side walls provided with front and rear posts, a barrier carried by the front post, a gate pivotally mounted upon the rear post and provided with a locking plate, a pivoted lever adapted to engage said plate, a hook to retain said lever in locked position, a tension spring extending between the rear end of said lever and said hook, and an operating lever pivotally mounted upon the rear post and connected to said hook to release the same from said lever.

14. In a device of the class described, side walls provided with front and rear posts, a barrier carried by the front post, a gate pivotally mounted on the rear post and provided with a locking plate, a spring mounted upon said gate and engaging the post to automatically open the gate, a pivoted lever adapted to engage said plate, a hook to retain said lever in locked position, a tension spring extending between the rear end of said lever and said hook, and an operating lever pivotally mounted upon the rear post and connected to said hook to release the same from said lever.

15. In a device of the class described, side walls, a barrier carried thereby, a pivoting bracket at the lower portion thereof, and a pivoting sleeve at the upper portion adapted to be adjusted upon the supporting member of said barrier.

16. In a device of the class described, side walls provided with front and rear posts, a barrier mounted upon one of the front posts and provided with a retaining loop at its free end, a rod to engage said loop, and means for reciprocating said rod.

17. In a device of the class described, side walls provided with front and rear posts, a barrier mounted upon one of the front posts and provided with a retaining loop at its free end, a rod to engage said loop, a bearing upon said side wall for said rod, a collar secured to said rod, a spring extending between said bearing and collar, and a retaining device for normally retaining said spring under tension.

18. In a device of the class described, a plurality of side walls forming independent stalls each provided with a pivoted spring controlled barrier thereon adapted to engage an adjacent wall.

19. In a device of the class described, a plurality of independent parallel side walls forming a stall, an automatically opening barrier pivotally mounted upon one wall and extending between the front portions of said walls, means upon the adjacent wall for retaining and releasing said barrier, and means for operating said releasing means from a point removed therefrom.

20. In a device of the class described, a plurality of independent parallel side walls forming a stall, an automatically opening barrier pivotally mounted upon one wall and extending between the front portions of said walls, means upon the adjacent wall for retaining and releasing said barrier, means for operating said releasing means from a point removed therefrom, and an automatically opened end gate pivotally mounted on one of said walls to engage the opposite wall and close the rear of the stall.

In testimony whereof, I affix my signature in presence of two witnesses.

DAVID STITZER.

Witnesses:
 HORACE GEERS,
 M. C. GIBBINS.